(12) United States Patent
Stille

(10) Patent No.: US 8,475,323 B2
(45) Date of Patent: Jul. 2, 2013

(54) COMBINATION BRAKE CLUTCH DRIVE SYSTEM AND ROTARY-WING AIRCRAFT USING SAME

(75) Inventor: Brandon L. Stille, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 536 days.

(21) Appl. No.: 12/758,874

(22) Filed: Apr. 13, 2010

(65) Prior Publication Data

US 2010/0279815 A1    Nov. 4, 2010

Related U.S. Application Data

(60) Provisional application No. 61/173,954, filed on Apr. 29, 2009.

(51) Int. Cl.
*F16H 3/54*        (2006.01)
(52) U.S. Cl.
USPC .......................................... 475/286; 475/900
(58) Field of Classification Search
USPC ................................. 475/286, 900
See application file for complete search history.

(56) References Cited

U.S. PATENT DOCUMENTS

| | | | | |
|---|---|---|---|---|
| 716,180 | A * | 12/1902 | Brewster ...................... | 475/286 |
| 737,830 | A * | 9/1903 | Duryea et al. ................ | 192/215 |
| 1,851,146 | A | 3/1932 | Banker | |
| 2,037,766 | A * | 4/1936 | De La Cierva ............. | 244/17.25 |
| 3,035,789 | A * | 5/1962 | Young ............................ | 244/7 C |
| 3,161,241 | A * | 12/1964 | Allen et al. ..................... | 173/14 |
| 3,977,812 | A * | 8/1976 | Hudgins ........................ | 416/123 |
| 4,046,235 | A | 9/1977 | Shutt | |
| 4,216,848 | A | 8/1980 | Shimodaira | |
| 4,219,107 | A | 8/1980 | Ford et al. | |
| 4,798,052 | A | 1/1989 | McAfee | |
| 4,976,669 | A * | 12/1990 | Jones ............................ | 475/248 |
| 5,318,245 | A | 6/1994 | Sato et al. | |
| 5,529,459 | A | 6/1996 | Pancotti | |
| 5,853,152 | A | 12/1998 | Evans et al. | |
| 5,855,471 | A | 1/1999 | Chory | |
| 6,019,578 | A | 2/2000 | Hager et al. | |
| 6,030,177 | A | 2/2000 | Hager | |
| 6,077,042 | A | 6/2000 | Pancotti et al. | |
| 6,193,464 | B1 | 2/2001 | Nyhus et al. | |
| 6,342,026 | B1 * | 1/2002 | Takagi et al. ................ | 475/276 |
| 6,991,072 | B2 | 1/2006 | Bonfils | |
| 7,083,142 | B2 | 8/2006 | Scott | |
| 7,168,533 | B2 | 1/2007 | Podratzky | |
| 7,210,651 | B2 | 5/2007 | Scott | |
| 2002/0043436 | A1* | 4/2002 | Burgdorf et al. ........... | 188/73.38 |

FOREIGN PATENT DOCUMENTS

| | | |
|---|---|---|
| DE | 19500539 | 7/1995 |
| EP | 0894712 | 2/1999 |

\* cited by examiner

*Primary Examiner* — Sherry Estremsky
(74) *Attorney, Agent, or Firm* — Carlson, Gaskey & Olds PC

(57) ABSTRACT

A drive system includes a planetary gear system. An input is affixed to a sun gear of the planetary gear system to rotate therewith and an output is affixed to the output ring gear to rotate therewith. A first brake system is selectively operable to rotationally lock an output ring gear of the planetary gear system, and a second brake system is selectively operable to rotationally lock the planet carrier of the planetary gear system. Rotary-wing aircraft implementations of the drive system are also disclosed.

21 Claims, 9 Drawing Sheets

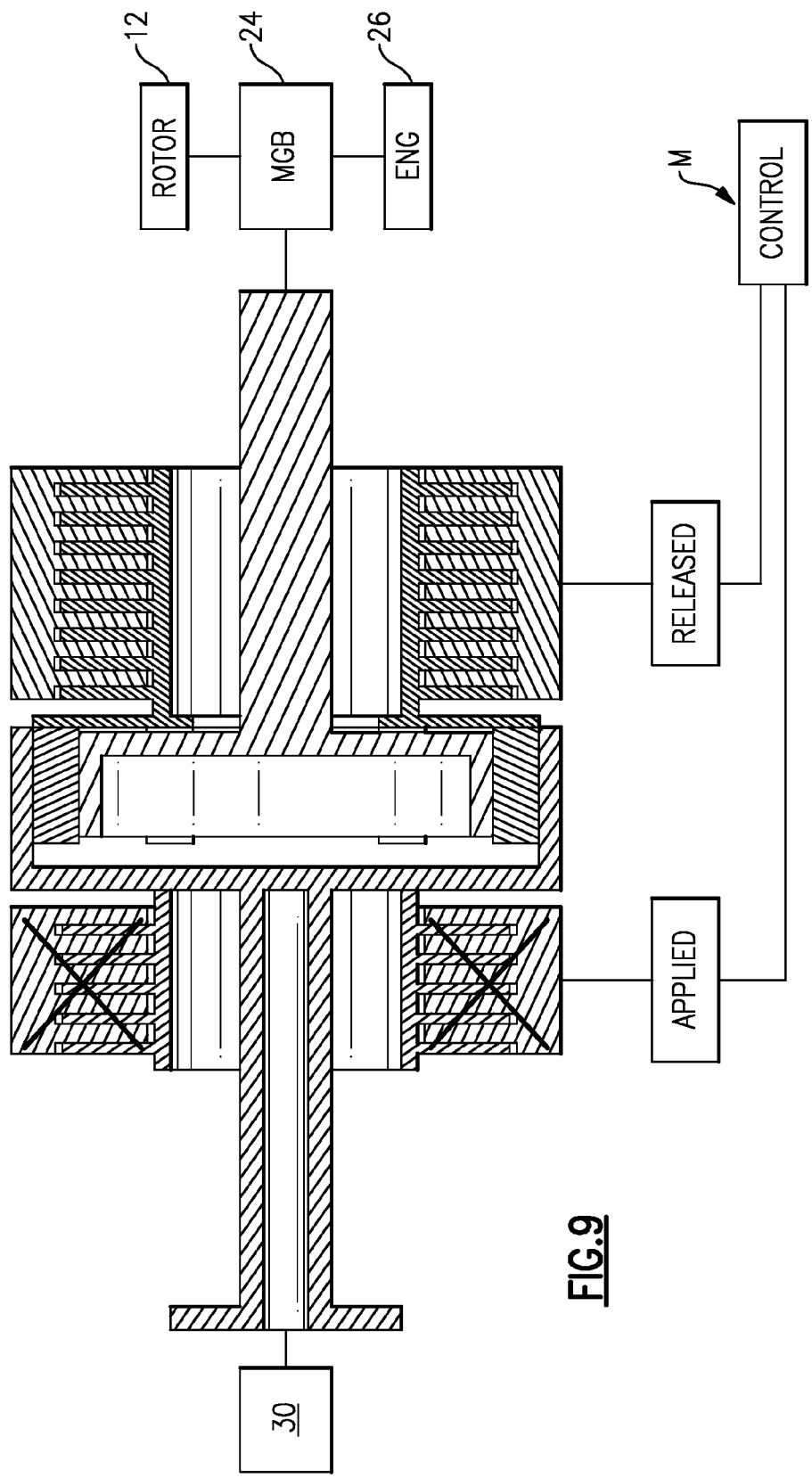

COMBINATION BRAKE CLUTCH DRIVE SYSTEM AND ROTARY-WING AIRCRAFT USING SAME

REFERENCE TO RELATED APPLICATIONS

The present disclosure claims priority to U.S. Provisional Patent Application No. 61/173,954, filed Apr. 29, 2009.

BACKGROUND

The present disclosure relates to a drive system suitable for use with, e.g., a rotary-wing aircraft, and more particularly to a gearbox which selectively operates as a brake system for an input (e.g., from a main gearbox of a rotary-wing aircraft) and a brake system for an output (e.g., a translational thrust system of the rotary-wing aircraft).

Rotary-wing aircraft such as helicopters often include rotor brake systems to brake the rotation of the main and tail rotor system when the rotary-wing aircraft is on the ground. Although effective, rotor brake systems are operated relatively infrequently. The aircraft must therefore carry a relatively significant weight for a dedicated system which is operated relatively infrequently.

SUMMARY

A drive system for a rotary-wing aircraft according to an exemplary aspect of the present disclosure includes a planetary gear system. An input is affixed to a sun gear of the planetary gear system to rotate therewith and an output is affixed to the output ring gear to rotate therewith. A first brake system selectively operable to rotationally lock said output ring gear and a second brake system selectively operable to rotationally lock said planet carrier of said planetary gear system.

A method of braking a main rotor system of a rotary wing aircraft according to an exemplary aspect of the present disclosure includes driving a main rotor system through a main gearbox and selectively operating both a second brake system and a first brake system downstream of the main gearbox to brake the main rotor system.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is a sectional view of the combined gearbox operated to brake the translational thrust system.

DETAILED DESCRIPTION

Figure 1:
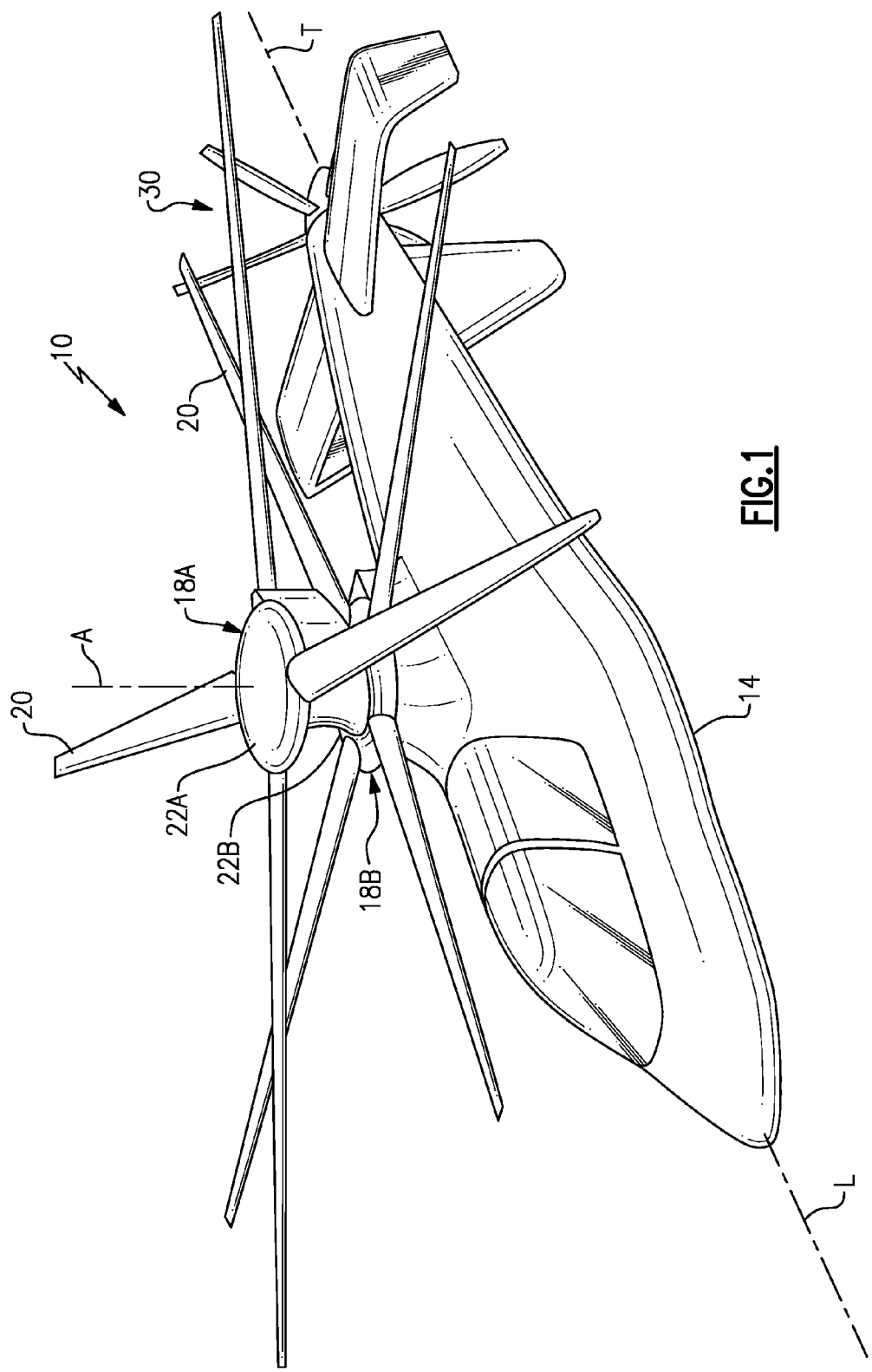
FIG. 1 is a general schematic view of an exemplary rotary wing aircraft embodiment for use with the present disclosure.

FIG. 1 schematically illustrates an exemplary high speed vertical takeoff and landing (VTOL) rotary-wing aircraft 10 having a counter-rotating, coaxial rotor system 12 which rotates about an axis of rotation A. The aircraft 10 includes an airframe 14 which supports a drive system 16 (FIG. 2) that generally includes the rotor system 12 as well as a translational thrust system 30 which provides translational thrust generally parallel to an aircraft longitudinal axis L while the main rotor system 12 operates in an unloaded reverse flow state during a high-speed forward flight profile. Although a particular aircraft configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotor, tilt-wing aircraft and non-aircraft applications will also benefit herefrom.

The rotor system 12 includes an upper rotor system 18A and a lower rotor system 18B. Each rotor system 18A, 18B includes a multiple of rotor blades 20 mounted to a respective rotor hub 22A, 22B for rotation about a rotor axis of rotation A. Any number of blades 20 may be used with the rotor system 12.

Figure 2:
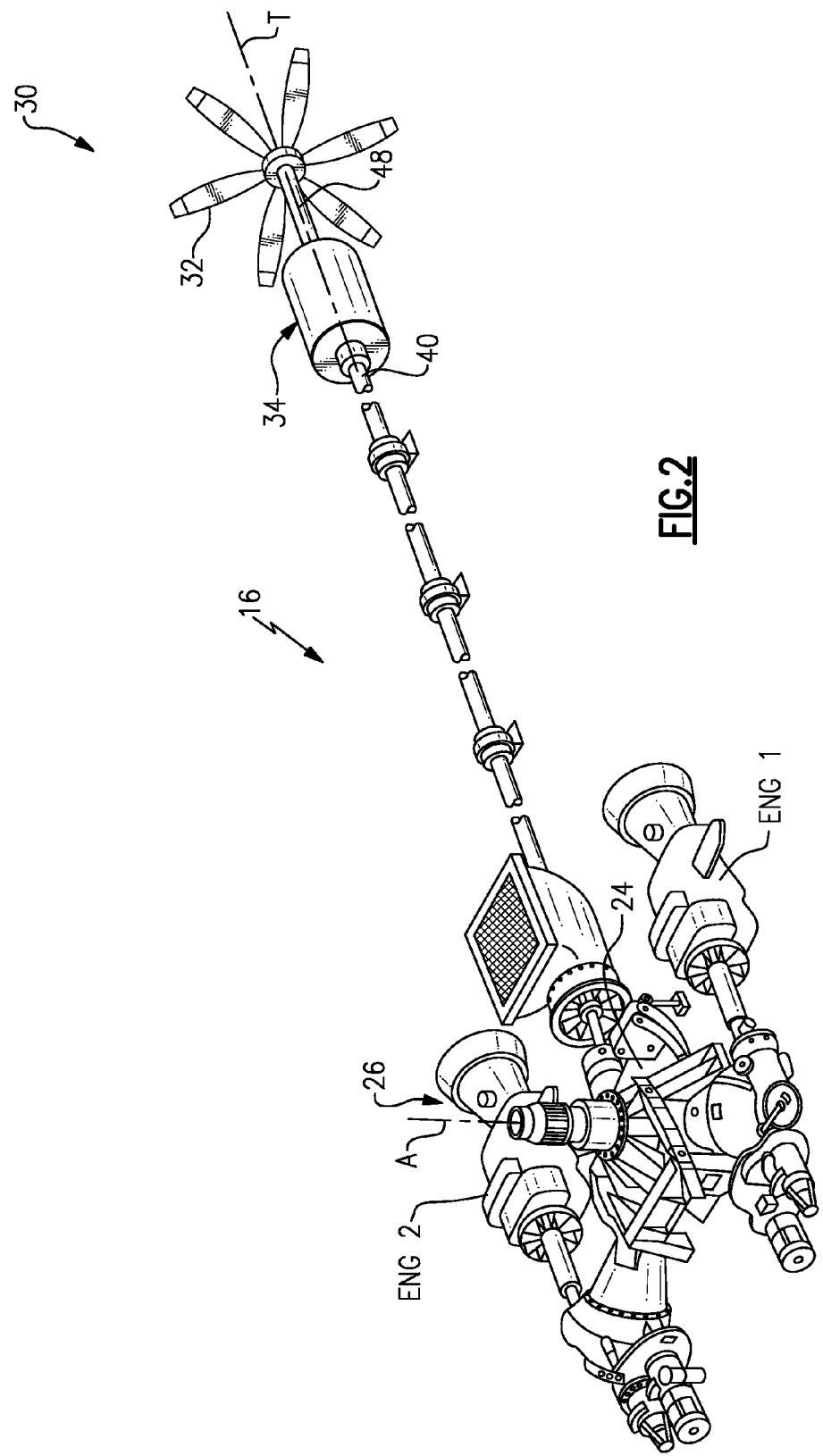
FIG. 2 is a general schematic view of a drive system for the rotary wing aircraft.

Referring to FIG. 2, the main rotor assembly 12 is driven about the axis of rotation A through a main gearbox (MGB) 24 by a multi-engine powerplant system 26—here having two engine packages ENG1, ENG2. The multi-engine powerplant system 26 generates the power available for flight operations and couples such power to the main rotor assembly 12 and the translational thrust system 30 through the MGB 24. The MGB 24 may be interposed between the powerplant system 26, the rotor system 12 and the translational thrust system 30.

The translational thrust system 30 in one non-limiting embodiment may be mounted to the rear of the airframe 14 with the rotational axis T oriented substantially horizontal and parallel to the aircraft longitudinal axis L to provide thrust for high-speed flight. It should be understood that other configurations of the translational thrust system such as a propeller system mounted to each side of the air frame may alternatively be utilized. In this disclosed, non-limiting embodiment, the translational thrust system 30 includes a pusher propeller system 32.

A portion of the drive system 16 downstream of the MGB 24 includes a combined gearbox 34. The combined gearbox 34 selectively operates as a clutch and a brake for operation of the translational thrust system 30 with the MGB 24. The combined gearbox 34 also operates to provide a rotor brake function for the main rotor system 12.

Figure 3:
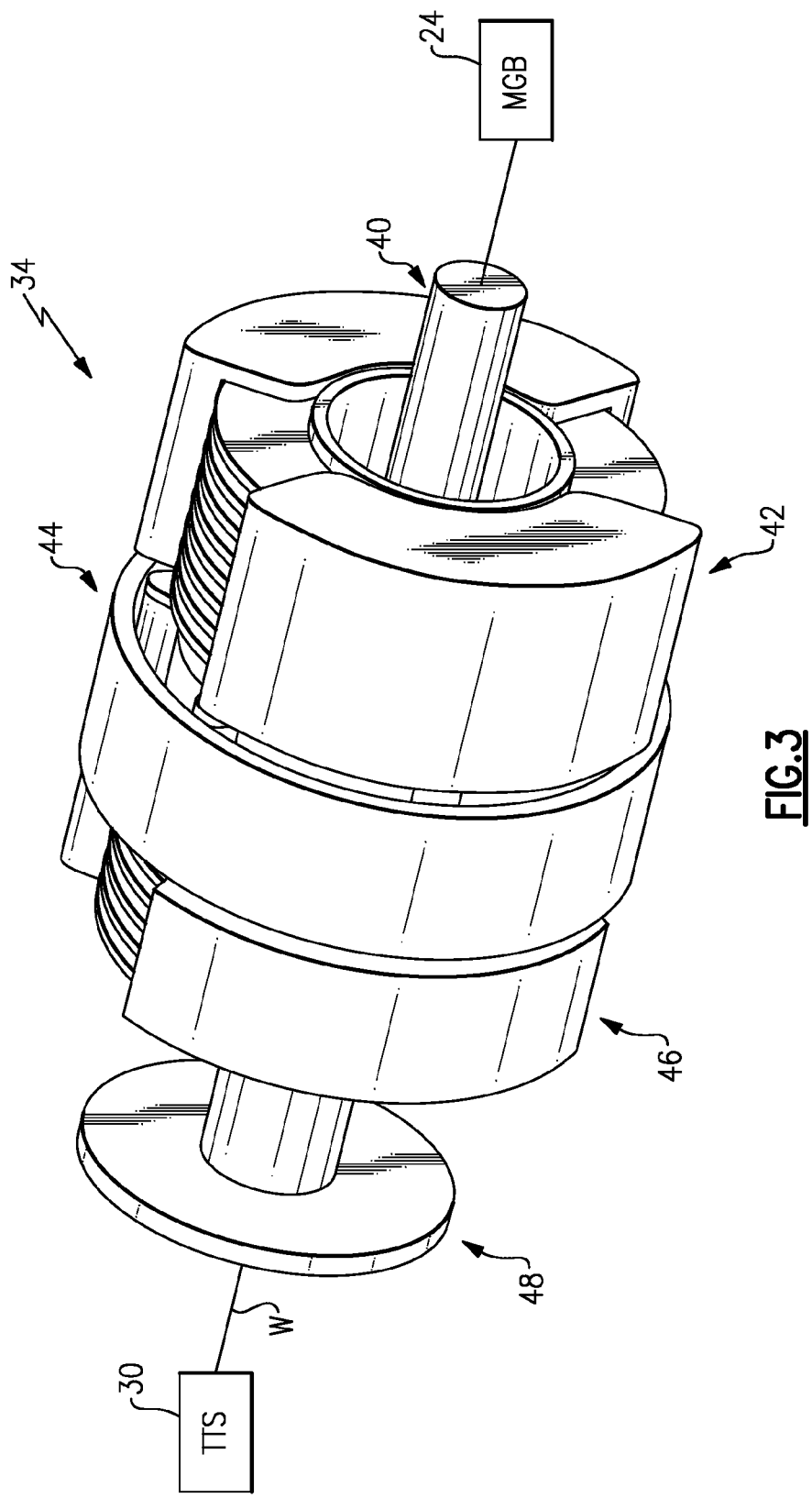
FIG. 3 is a general perspective view of a combined gearbox which selectively operates as a clutch and a brake for operation of a translational thrust system within the drive system.

Referring to FIG. 3, the combined gearbox 34 generally includes an input 40 (see also FIG. 2), a second brake system 42, a planetary gear system 44, a first brake system 46 and an output 48 (see also FIG. 2) generally defined along an axis W which is generally parallel to rotational axis T. The input 40 is generally upstream of the combined gearbox 34 relative the MGB 24 and the output 48 is downstream of the combined gearbox 34 and upstream of the pusher propeller system 32 (FIG. 2).

The functions of the second brake system 42 and the first brake system 46 respectively include transferring torque from an input shaft to an output shaft (clutching) or stopping and holding a load (braking). Though offered as separate brake components, their functions may be combined into a single unit disclosed herein. The second brake system 42 and the first brake system 46 may be categorized by the technique used to engage or stop the load such as friction, electromagnetic, mechanical lockup, etc, and by the method used to actuate such as mechanical, electric, pneumatic, hydraulic, self-activating, etc. It should be understood that various second brake systems and first brake systems may be utilized to include but not to be limited to mechanical, electrically, hydraulic and various combinations thereof.

The input 40 is located within the drive system 34 downstream of the MGB 24. The output 48 is located within the drive system 34 upstream of the translational thrust system 30. In the disclosed non-limiting embodiment, the combined gearbox 34 is located just upstream of the pusher propeller system 32. It should be understood that various interfaces may be utilized to mount the combined gearbox 34 within the drive system 34.

Figure 4:
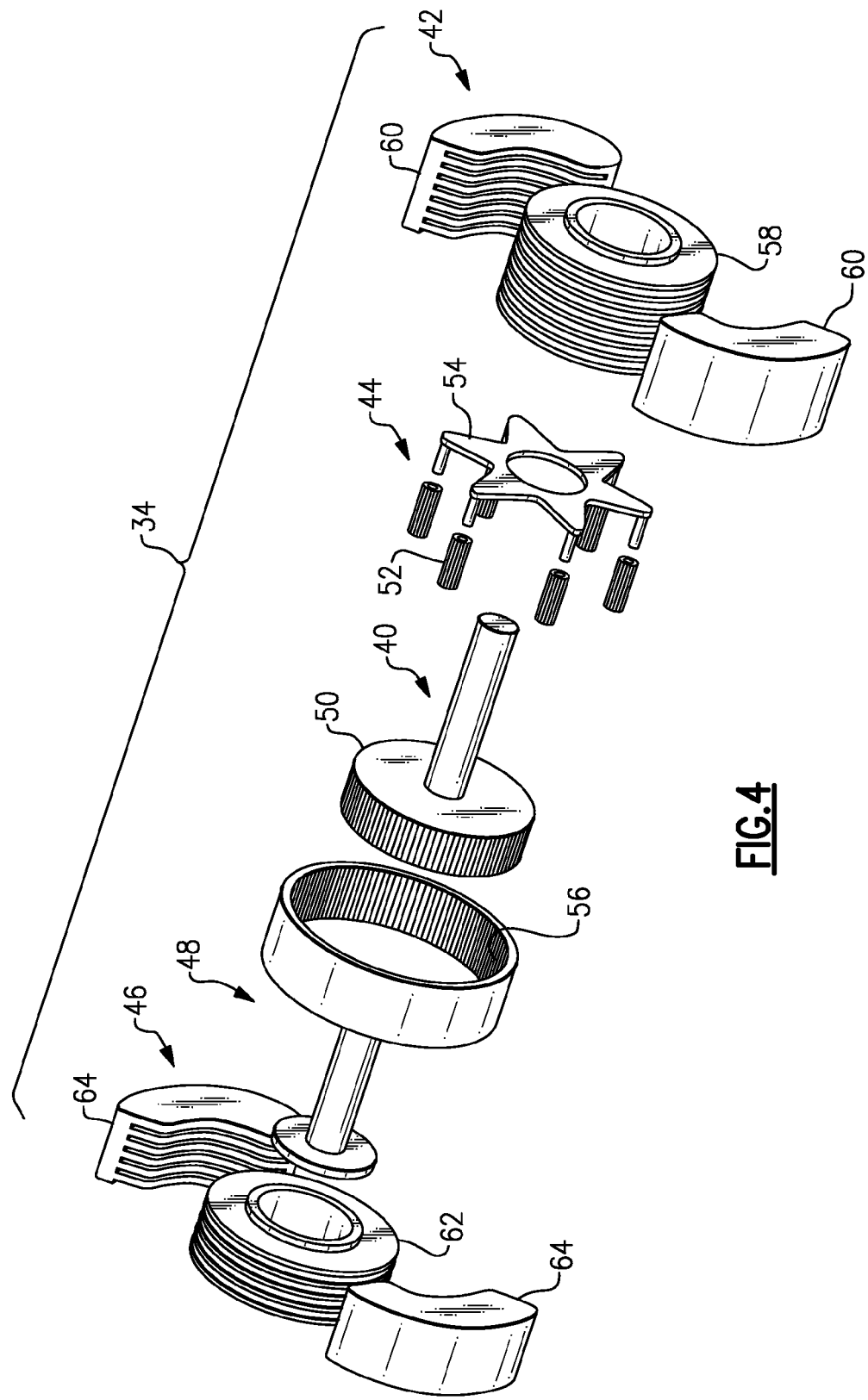
FIG. 4 is an exploded view of the combined gearbox.

Referring to FIG. 4, the input 40 is mounted to a sun gear 50 which is in meshing engagement with a multiple of planet gears 52. The multiple of planet gears 52 are supported on a planet carrier 54. The multiple of planet gears 52 are in meshing engagement with an output ring gear 56 mounted to the output 48.

Figure 5:
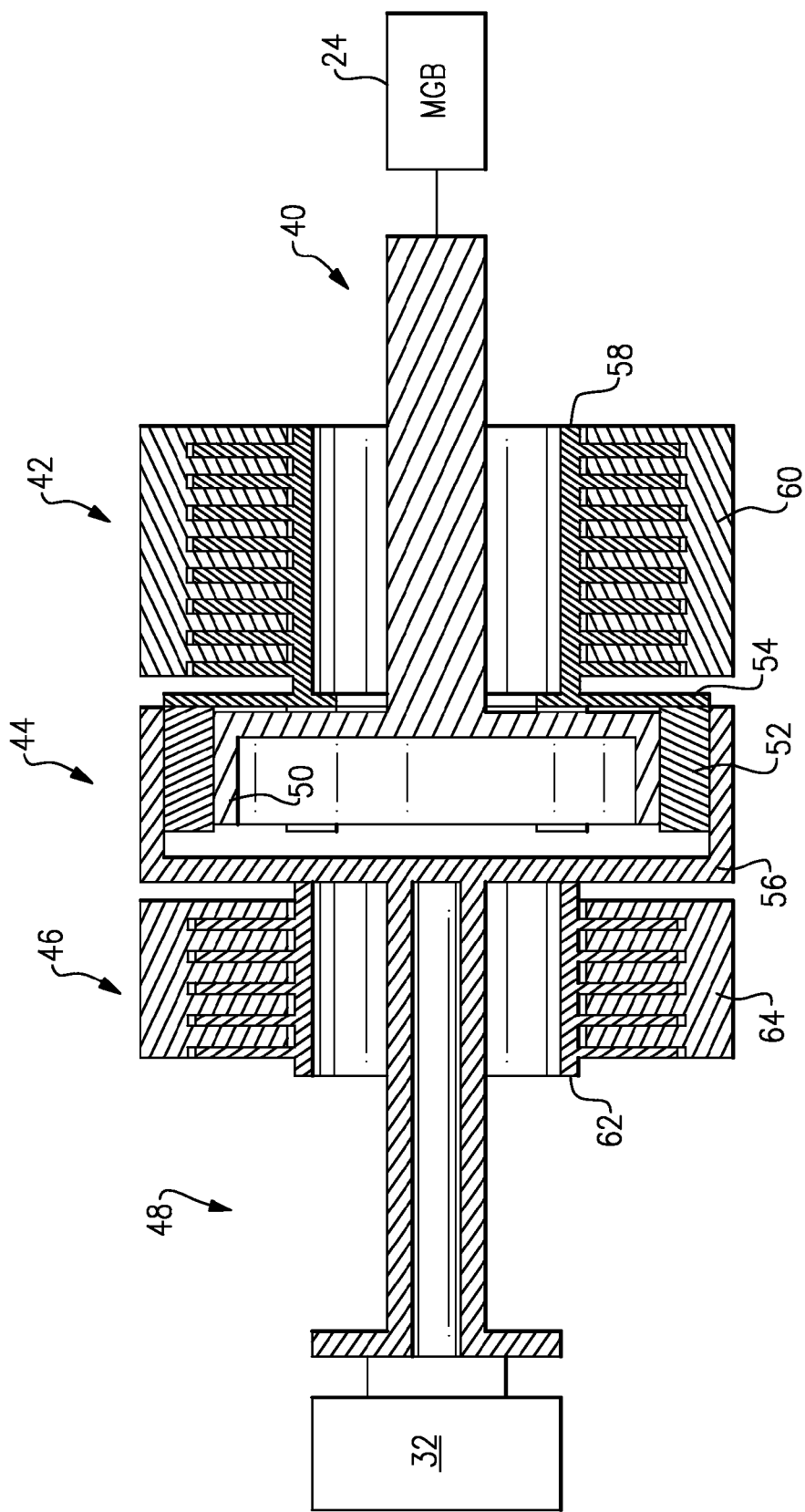
FIG. 5 is a sectional view of the combined gearbox.

The second brake system 42 includes a second brake plate assembly 58 fixed to the planet carrier 54 (FIG. 5) and a second clutch actuator 60 fixed to ground such as the aircraft airframe 14. The second clutch actuator 60 selectively engages the second brake plate assembly 58 such that the planet carrier 54 is stationary during engagement. Power is thereby driven from the sun gear 50 though the multiple of planet gears 52 and into the output ring gear 56.

There is a change in the direction of rotation when the input 40 is driving the output 48 through the rotationally fixed planet carrier 54. The overall reduction ratio between the input 40 and the output 48 is the ratio of the radius of the sun gear 50 to output ring gear 56.

The first brake system 46 includes a first brake plate assembly 62 fixed to the output ring gear 56 (FIG. 5) and a first brake actuator 64 which is fixed to ground such as the aircraft airframe 14. The first brake actuator 64 selectively engages the first brake plate assembly 62 such that the output ring gear 56 is stationary and the planet carrier 54 is free to rotate during engagement. Power is thereby driven from the sun gear 50 and into the multiple of planet gears 52 which freely rotate but drive nothing.

Figure 6:
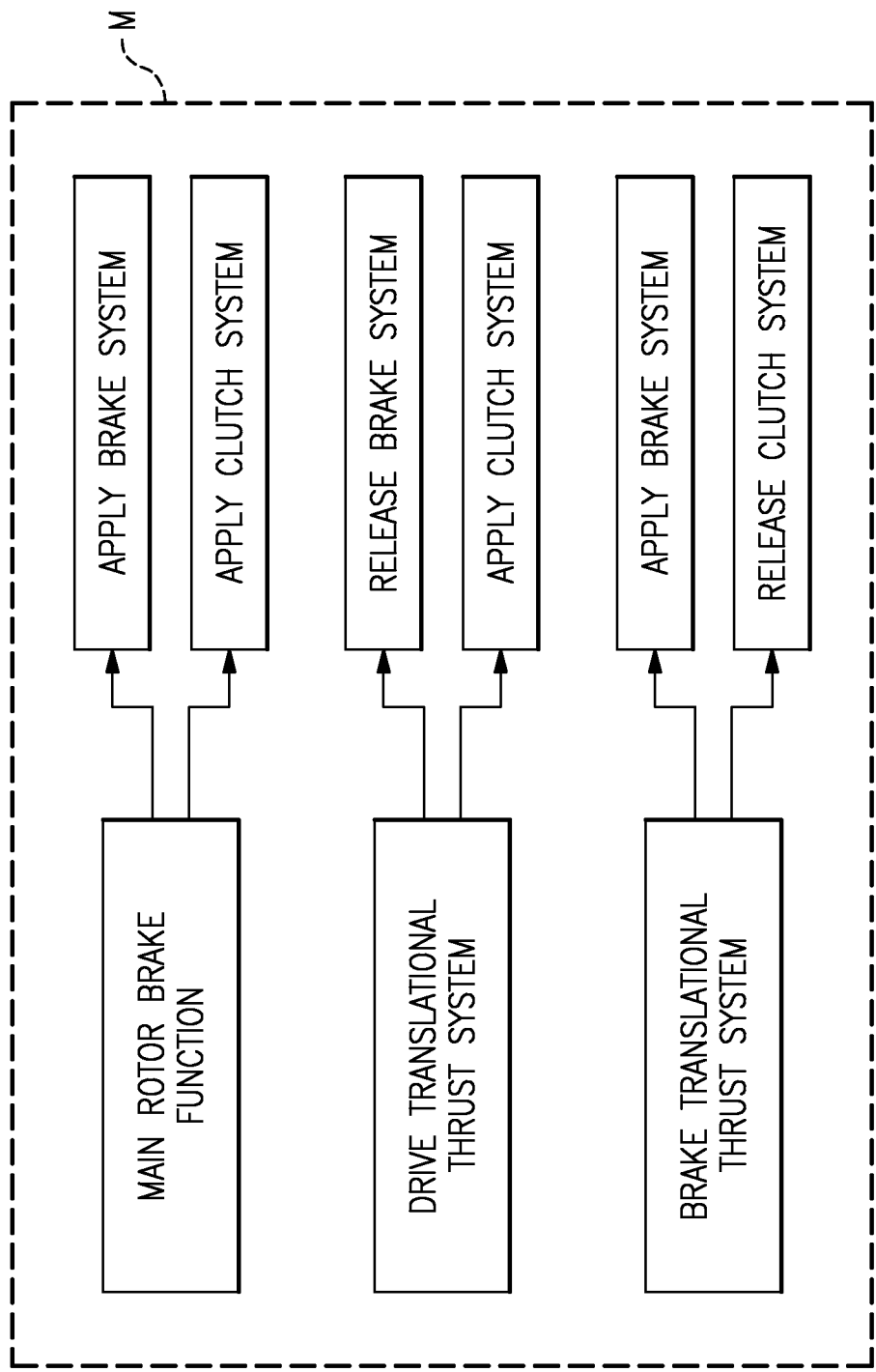
FIG. 6 is a block diagram of a translational thrust system algorithm.

Referring to FIG. 6, selective operation of the second brake system 42 and the first brake system 46 within the combined gearbox 34 may be performed through a translational thrust system algorithm. In the example of FIG. 6, the "brake system" is the first brake system 46 and the "clutch system" is the second brake system 42. The functions of the translational thrust system algorithm are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment such as a control module M. In one non-limiting embodiment, the module may be a portion of a flight control computer, a portion of a central vehicle control, an interactive vehicle dynamics module, a stand-alone line replaceable unit or other system.

The module typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the control algorithms for operation of the minimal actuation power algorithm as described herein. The interface facilitates communication with the other avionics and systems.

Figure 7:
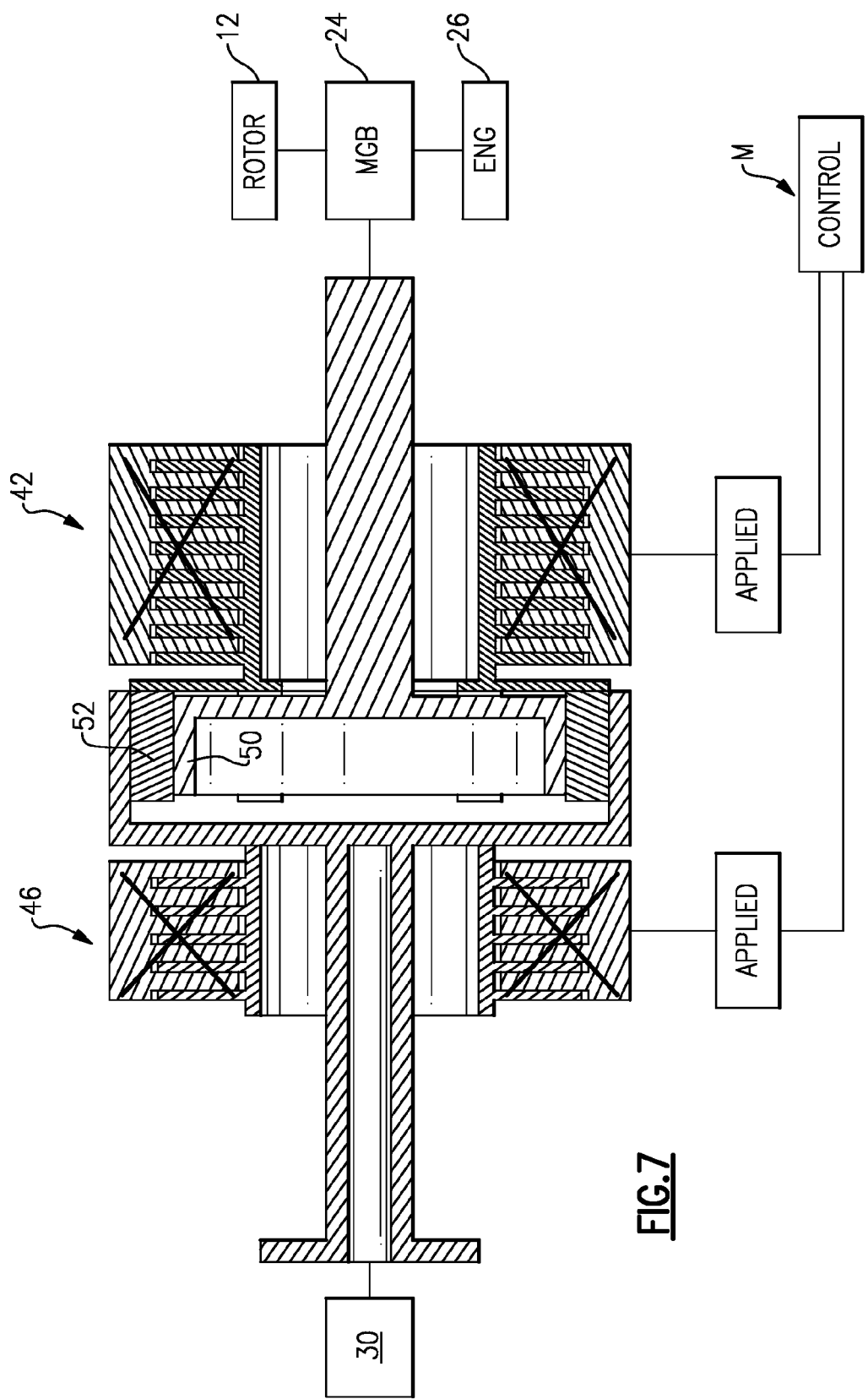
FIG. 7 is a sectional view of the combined gearbox operated as a main rotor brake.

In one operational example, the aircraft is on the ground such that the second brake system 42 and the first brake system 46 are applied (FIG. 7). It should be understood that applied as utilized herein may take various forms to rotationally lock the particular system 42, 46. With both the second brake system 42 and the first brake system 46 applied, the combined gearbox 34 provides a brake function for the main rotor system 12. The multi-engine powerplant system 26 is started and the second brake system 42 is released such that the main rotor system 12 may spin-up through the MGB 24. With the second brake system 42 released and the first brake system 46 applied, power from the MGB 24 drives the sun gear 50 within the multiple of planet gears 52 which freely rotate but drive nothing.

Figure 8:
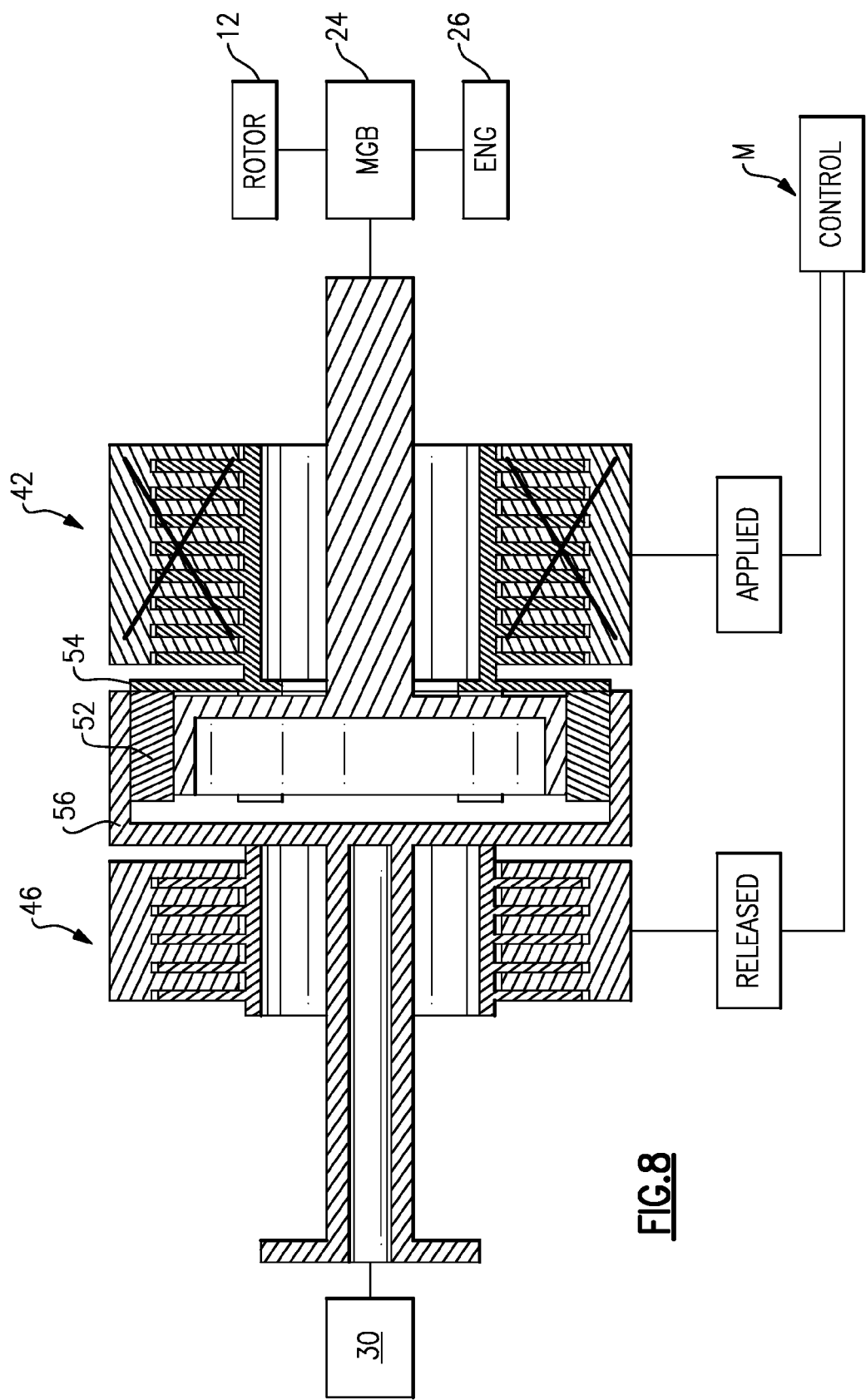
FIG. 8 is a sectional view of the combined gearbox operated to drive the translational thrust system.

To power the translational thrust system 30 such as once the aircraft has obtained a desired flight condition, the first brake system 46 is released and the second brake system 42 is applied to spin-up and absorb power from the MGB 24 into the translational thrust system 30 (FIG. 8). With the second brake system 42 applied and the first brake system 46 released, power from the MGB 24 drives the sun gear 50 which drives the multiple of planet gears 52. The multiple of planet gears 52 drive the output ring gear 56 to drive the output 48 and thus power the translational thrust system 30.

The general difference between the first brake system 46 and the second brake system 42 is that the first brake system 46 need only perform a brake operation of the translational thrust system 30, however, the second brake system 42 may be required to feather-in power from the MGB 24 in a smooth clutch like motion to spin-up the translational thrust system 30. The second brake system 42 may therefore be of a somewhat different construction than the first brake system 46 such as, for example, to include additional brake plates. Notably, as the first brake system 46 is released, and the second brake system is applied, the translational thrust system 30 is assisted in spin-up from airflow therethrough when in a flight condition which facilitates the smooth clutch like motion.

From the operational condition in which the second brake system 42 is released and the first brake system 46 is applied, as typical of the aircraft on the ground, application of the second brake system 42 and the first brake system 46 at the same time allows the combined gearbox 34 to brake the drive system 33 and the main rotor system 12 through the MGB 24 (FIG. 2).

Notably, failure within either the first brake system 46 or the second brake system 42 results in a mechanical fail-safe condition in which neither the translational thrust system 30 nor rotor brake functionality will be active such that the aircraft can continue normal flight operations with the main rotor system 12 driven through the MGB 24.

The translational thrust system 30 may be designed to absorb more power from the MGB 24 than the main rotor system 12 such that application of a rotor first brake system through the combined gearbox 34 downstream of the MGB 24 will brake the main rotor system 12.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A drive system comprising:
   a planetary gear system which includes a sun gear in meshing engagement with a multiple of planet gears, said multiple of planet gears supported on a planet carrier, said multiple of planet gears in meshing engagement with an output ring gear;
   an input affixed to said sun gear of said planetary gear system to rotate therewith;
   an output affixed to said output ring gear to rotate therewith;
   a first brake system selectively operable to rotationally lock said output ring gear;
   a second brake system selectively operable to rotationally lock said planet carrier of said planetary gear system; and
   a translational thrust system driven by said output.

2. The drive system as recited in claim 1, wherein said second brake system includes a brake plate assembly fixed to said planet carrier.

3. The drive system as recited in claim 2, wherein said second brake system includes a clutch actuator configured to be fixed to ground, said clutch actuator selectively operable to rotationally lock said second brake plate assembly.

4. The drive system as recited in claim 3, wherein said second clutch actuator is configured to be fixed to an airframe of a rotary-wing aircraft.

5. The drive system as recited in claim 1, wherein said first brake system includes a brake plate assembly fixed to output ring gear.

6. The drive system as recited in claim 5, wherein said first brake system includes a brake actuator configured to be fixed to ground, said brake actuator selectively operable to rotationally lock said brake plate assembly.

7. The drive system as recited in claim 6, wherein said brake actuator is configured to be fixed to an airframe of a rotary-wing aircraft.

8. The drive system as recited in claim 1, further comprising a control module to selectively operate said second brake system and said first brake system.

9. The drive system as recited in claim 1, further comprising a main gearbox (MGB) which drives said input.

10. The drive system as recited in claim 9, further comprising a main rotor system driven by said main gearbox (MGB).

11. The drive system as recited in claim 10, wherein said main rotor system axis of rotation is transverse to said translational thrust system axis of rotation.

12. The drive system as recited in claim 10, wherein said translational thrust system extends from a tail of a rotary-wing aircraft.

13. The drive system as recited in claim 9, wherein said output extends in a direction opposite said main gearbox.

14. The drive system as recited in claim 1, wherein said first brake system and said second brake system are mechanically activated.

15. The drive system as recited in claim 1, wherein said first brake system and said second brake system are electrically activated.

16. The drive system as recited in claim 1, wherein said first brake system and said second brake system are hydraulically activated.

17. The drive system as recited in claim 1, wherein said first brake system and said second brake system are pneumatically activated.

18. The drive system as recited in claim 1, wherein the input affixed to said sun gear and the output affixed to said output ring gear extend in opposite axial directions.

19. The drive system as recited in claim 1, wherein the first brake system is axially spaced from the output ring gear.

20. The drive system as recited in claim 1, wherein said output extends towards a distal end of a tail of a rotary-wing aircraft.

21. The drive system as recited in claim 1, wherein said input extends in the same axial direction as said planet carrier.

* * * * *